United States Patent
Onishi

(10) Patent No.: US 7,620,298 B2
(45) Date of Patent: Nov. 17, 2009

(54) DISC REPRODUCING APPARATUS

(75) Inventor: Yoshikazu Onishi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 667 days.

(21) Appl. No.: 11/153,337

(22) Filed: Jun. 16, 2005

(65) Prior Publication Data

US 2005/0281139 A1    Dec. 22, 2005

(30) Foreign Application Priority Data

Jun. 18, 2004    (JP)    ............... P2004-181629

(51) Int. Cl.
*H04N 7/26* (2006.01)
*H04N 9/89* (2006.01)
*H04N 5/91* (2006.01)
*H04N 7/00* (2006.01)

(52) U.S. Cl. .................. 386/105; 386/15; 386/82; 386/106; 386/96

(58) Field of Classification Search .............. 386/15, 386/82, 96, 105–106
See application file for complete search history.

(56) References Cited

U.S. PATENT DOCUMENTS 6,317,779 B1 * 11/2001 Gile et al. ................ 709/217
7,305,694 B2 * 12/2007 Commons et al. ........... 725/80
7,366,162 B2 *  4/2008 Kojo ..................... 370/352
2004/0070576 A1 *  4/2004 Sakurai et al. ............ 345/204

FOREIGN PATENT DOCUMENTS

| JP | 1996-031129 | 2/1996 |
|---|---|---|
| JP | 11-265566 | 9/1999 |
| JP | 2001-167556 | 6/2001 |
| JP | 2001-176205 | 6/2001 |
| JP | 2002-100161 | 4/2002 |

* cited by examiner

*Primary Examiner*—Thai Tran
*Assistant Examiner*—Daquan Zhao
(74) *Attorney, Agent, or Firm*—Morgan, Lewis & Bockius LLP

(57) ABSTRACT

A reproducing apparatus including a reproducing unit for reproducing an SACD held in a reproduction position and outputting an audio signal and also reading disc control information from the SACD when the SACD is held in the reproduction position, and a genre display unit for displaying a genre of a tune recorded on the SACD on a display device based on the disc control information outputted by the reproducing unit. The genre display unit automatically displays the genre on the display device when the reproducing unit outputs the disc control information read from the SACD.

1 Claim, 3 Drawing Sheets

| SACD 223 | | | |
|---|---|---|---|
| TRACK | GENRE | REPRODUCTION POSITION | LENGTH OF TUNE |
| 1 | JAZZ | | 6:35 |
| 2 | JAZZ | 2:57 | 5:47 |
| 3 | JAZZ | | 4:11 |
| 4 | JAZZ | | 13:35 |
| 5 | CLASSICAL | | 8:22 |
| 6 | CLASSICAL | | 15:35 |

DISC REPRODUCING APPARATUS

BACKGROUND OF THE INVENTION

1. Field of the Invention

The present invention relates to a disc reproducing apparatus for displaying a genre of tunes recorded on an SACD (Super Audio CD) on a display device, and more specifically to a disc reproducing apparatus for displaying a genre automatically when the SACD is held in a reproduction position.

2. Description of the Related Art

Since there is an SACD for recording an audio signal by a DSD (Direct Stream Digital) method in one of media capable of recording an audio signal with high quality of sound, a disc reproducing apparatus capable of reproducing the SACD as well as reproducing a DVD or a CD has been proposed. In the case of the disc reproducing apparatus with such a configuration, various information can be displayed using a display device such as a television image receiver, so that when the SACD is placed on a tray and the tray is retracted in a holding position, displaying of a character of "SACD" on the display device indicates that a reproduced disc is the SACD (a first conventional art).

Also, the following art has been proposed (a second conventional art). That is, in this art, a CD changer and a system control part are disposed. It is constructed so that CDs on which keywords for retrieval are recorded are held in the CD changer, and a genre code indicating a genre of music recorded is included in the keyword for retrieval. As a result of this, in the case of selecting a menu for displaying a list of genres after a list of menus is displayed by operating a menu key disposed in an operation panel of the system control part, the list of genres is displayed on a display device disposed in the operation panel. When a desired genre is selected from the list of genres displayed on the display device, all the CD titles of the CDs belonging to the selected genre among the CDs held in the CD changer are displayed. As a result of this, when a desired CD title is selected from the displayed CD titles using a cursor, it is constructed so as to start reproduction of a CD corresponding to the selected CD title. Incidentally, the fact that display of the list of genres is not limited to a configuration using the genre code included in the keyword for retrieval and a configuration using information indicating a genre inputted by a user oneself or a configuration using identification information included in a region other than the keyword for retrieval can also be implemented is disclosed together (for example, see JP-A-11-265566 (Paragraphs 0022 to 0024, FIG. 2).

Also, the following art has been proposed (a third conventional art). That is, in this art, many tunes such as 150 tunes can be recorded on a disc capable of recording data using an MP3 method. Also, nonvolatile memory is disposed and it is constructed so as to be associated with each of the tunes recorded on the disc and store a genre, the record date and the record time. In the case of reproduction, all the genres present inside the disc and the number of tunes belonging to each of the genres are listed by seeing the nonvolatile memory. When one of the genres displayed is specified, a tune included in the corresponding genre is selected and is reproduced (for example, see JP-A-2002-100161).

SUMMARY OF THE INVENTION

However, in the case of using the first conventional art, the following problem arose. That is, when the SACD attempts to be reproduced and is placed on the tray, the description displayed on the display device is only the character of "SACD" and other information is not displayed. In other words, the description displayed with respect to the SACD to be reproduced is very small. As a result of this, when the SACD attempts to be reproduced and is placed on the tray, a display function of indicating that the SACD placed on the tray is an SACD on which tunes of any genre are recorded has been desired.

The second conventional art is an art in which in the case of using CDs on which keywords for retrieval are recorded, a list of genres capable of selection is displayed and also when a genre is selected from the list, titles of the CDs belonging to the selected genre are displayed. That is, when a CD is set, it is not configured so as to indicate that the set CD is a CD on which tunes of any genre are recorded. As a result of this, in the problem arising in the first conventional art, that is, in the case of desiring display for indicating that the SACD placed on the tray when the SACD attempts to be reproduced and is placed on the tray is an SACD on which tunes of any genre are recorded, the art was an art difficult to apply.

The third conventional art is an art presumed that a user stores a genre in the nonvolatile memory when tunes are recorded on a disc. As a result of this, in the problem arising in the first conventional art, that is, in the case of desiring display for indicating that the SACD placed on the tray when the SACD attempts to be reproduced and is placed on the tray is an SACD on which tunes of any genre are recorded, the art was an art difficult to apply.

The invention is devised to solve the problem, and an object of the invention is to provide a disc reproducing apparatus in which by only performing an operation for holding an SACD in a reproduction position, genres of tunes recorded on the SACD can be indicated and an operation for selecting and reproducing a desired tune can be facilitated and a display screen of information about the SACD can be enhanced.

Also, another object of the invention is to provide a disc reproducing apparatus in which when a reproducing unit for reproducing a disc outputs disc control information read out of an SACD, genres of tunes recorded on the SACD are displayed automatically based on genre information included in the disc control information and thereby the genres of tunes recorded on the SACD can be indicated by only performing an operation for holding the SACD in a reproduction position.

Also, in addition to the objects, it is to provide a disc reproducing apparatus in which a genre of each tune is associated with a track number and is displayed and also the selected track number is highlighted and when instructions of reproduction are inputted, an operation for selecting and reproducing a desired tune can be facilitated by starting reproduction from a track highlighted.

In order to solve the problem, a disc reproducing apparatus according to an aspect of the invention is applied to a disc reproducing apparatus including a reproducing unit for reproducing an SACD held in a reproduction position and outputting an audio signal and also reading and outputting disc control information from the SACD when the SACD is held in the reproduction position, the reproducing unit for reading out and outputting image data recorded in a data area for extension when the image data is recorded in the data area for extension which is a data area disposed in the most outer circumference side of the SACD. Then, it is constructed so that when the reproducing unit reads the disc control information from the SACD, based on the disc control information, a genre of each tune recorded on the SACD is associated with a track number corresponding to each of the tunes and is automatically displayed on a display device and also the track number selected by a user is highlighted and when the reproducing unit reads and outputs the image data from the SACD, the image data outputted from the reproducing unit is displayed on the display device as an image for background in display of the genre, and the reproducing unit starts reproduction from a tune of the track number highlighted when instructions of reproduction are inputted.

That is, a genre display unit automatically displays a genre when the reproducing unit outputs the disc control information read from the SACD. On the other hand, the reproducing unit reads and outputs the disc control information from the SACD when the SACD is held in the reproduction position. Therefore, when the SACD is held in the reproduction position, a genre of tunes recorded on the SACD is automatically displayed on the display device even in the case that an operation for genre display is not inputted. And, a genre about each of the tunes is displayed, so that selection of a tune desirous of reproduction is facilitated. Then, after seeing the genre and selecting the tune, reproduction of the selected tune is started by only inputting instructions of reproduction. And, in information indicating the genre, an image indicated by image data is displayed as background.

Also, a disc reproducing apparatus according to another aspect of the invention is applied to a disc reproducing apparatus including a reproducing unit for reproducing an SACD held in a reproduction position and outputting an audio signal and also reading and outputting disc control information from the SACD when the SACD is held in the reproduction position. Then, it is constructed so that there is provided a genre display unit for displaying a genre of a tune recorded on the SACD on a display device based on the disc control information outputted by the reproducing unit, and the genre display unit automatically displays the genre on the display device when the reproducing unit outputs the disc control information read from the SACD.

That is, the genre display unit automatically displays a genre when the reproducing unit outputs the disc control information read from the SACD. On the other hand, the reproducing unit reads and outputs the disc control information from the SACD when the SACD is held in the reproduction position. Therefore, when the SACD is held in the reproduction position, a genre of tunes recorded on the SACD is automatically displayed on the display device even in the case that an operation for genre display is not inputted.

Also, in addition to the construction described above, it is constructed so that the genre display unit associates a genre of each tune recorded on the SACD with a track number corresponding to each of the tunes and displays the genre and also highlights the track number selected by a user, and the reproducing unit starts reproduction from a tune of the track number highlighted when instructions of reproduction are inputted.

That is, a genre about each of the tunes is displayed, so that selection of a tune desirous of reproduction is facilitated. Then, after seeing the genre and selecting the tune, reproduction of the selected tune is started by only inputting instructions of reproduction.

According to the invention, the genre display unit automatically displays a genre when the reproducing unit outputs the disc control information read from an SACD. On the other hand, the reproducing unit reads and outputs the disc control information from the SACD when the SACD is held in a reproduction position. Therefore, when the SACD is held in the reproduction position, a genre of tunes recorded on the SACD is displayed on a display device even in the case that an operation for genre display is not inputted. And, a genre about each of the tunes is displayed, so that selection of a tune desirous of reproduction is facilitated. Then, after seeing the genre and selecting the tune, reproduction of the selected tune is started by only inputting instructions of reproduction. And, in information indicating the genre, an image indicated by image data is displayed as background. As a result of this, by only performing an operation for holding the SACD in the reproduction position, the genre of tunes recorded on the SACD can be indicated and an operation for selecting and reproducing a desired tune can be facilitated and a display screen of information about the SACD can be enhanced.

Also, according to the invention, the genre display unit automatically displays a genre when the reproducing unit outputs the disc control information read from the SACD. On the other hand, the reproducing unit reads and outputs the disc control information from the SACD when the SACD is held in the reproduction position. Therefore, when the SACD is held in the reproduction position, a genre of tunes recorded on the SACD is displayed on the display device without waiting for an operation of a user even in the case that an operation for genre display is not inputted, so that the genre of tunes recorded on the SACD can be indicated by only performing an operation for holding the SACD in the reproduction position.

Furthermore, a genre about each of the tunes is displayed, so that selection of a tune desirous of reproduction is facilitated. Then, after seeing the genre and selecting the tune, reproduction of the selected tune is started by only inputting instructions of reproduction, so that an operation for selecting and reproducing a desired tune can be facilitated.

DETAILED DESCRIPTION OF THE PREFFERED EMBODIMENTS

An embodiment of the invention will be described below with reference to the drawings.

Figures 2, 3:
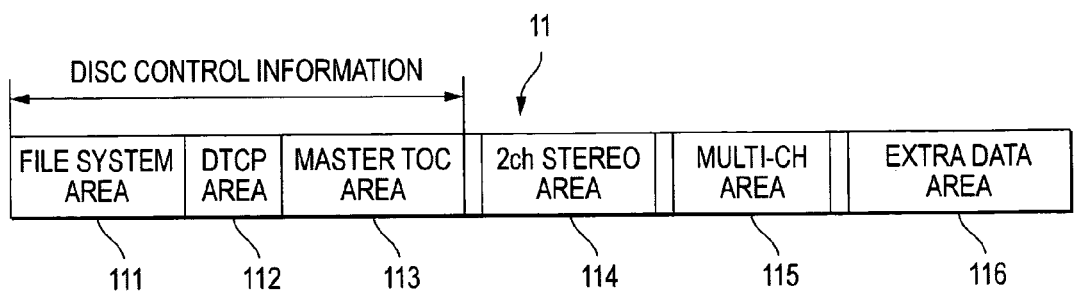
FIG. 2 is an explanatory diagram showing a record area of an SACD.
FIG. 3 is an explanatory diagram showing a screen of a television image receiver on which genre information is displayed.

FIG. 2 is an explanatory diagram showing a record area of an SACD.

In the drawing, an SACD (Super Audio CD) 11 is broadly divided into six areas 111 to 116 from the inner circumference side toward the outer circumference side. Disc control information is recorded in the areas 111 to 113 disposed in the inner circumference side of the area 114 (2ch Stereo Area) in which an audio signal is recorded, and genre information (Disc_Genre inside Disc_Info) indicating a genre about each of the tunes recorded in the area 114 is included in the disc control information recorded in the Master TOC Area 113 of the 510th sector from the inner circumference side. Also, data indicating an image such as a static image can be recorded in the data area for extension (area defined as "Extra Data Area" by a standard document) 116 disposed in the most outer circumference side.

Figure 1:
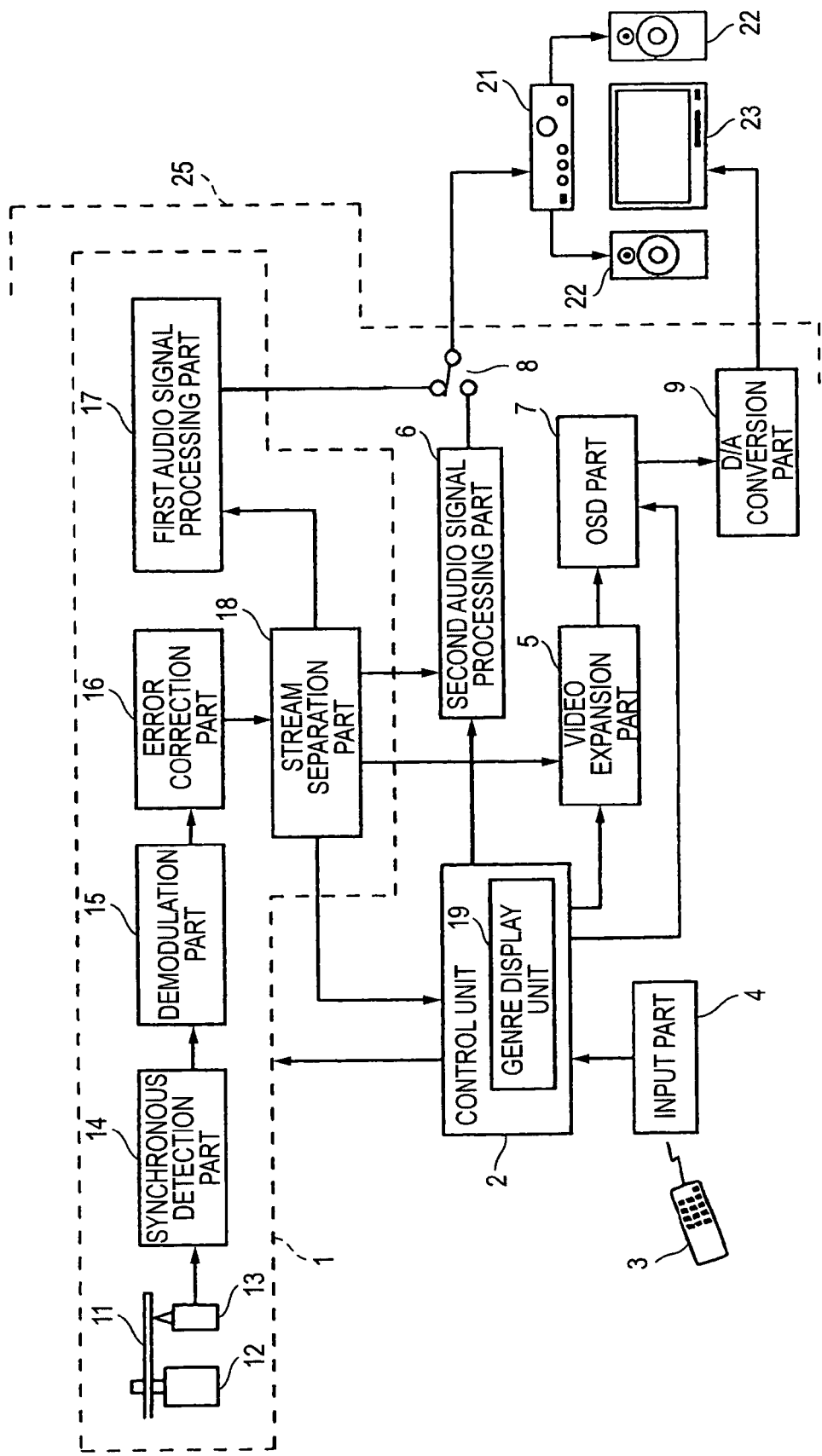
FIG. 1 is a block diagram showing an electrical configuration of one embodiment of a disc reproducing apparatus according to an embodiment of the invention.

FIG. 1 is a block diagram showing an electrical configuration of one embodiment of a disc reproducing apparatus according to the invention, and specifically shows the reproducing apparatus capable of reproduction of a DVD, a CD, a VCD and an SACD. Incidentally, in the following description, with respect to discs of four kinds of the DVD, the CD, the VCD and the SACD, the disc is simply called a disc when it is not necessary to distinguish these discs of four kinds, and the disc is called a DVD, a CD, a VCD or an SACD according to the kind of disc 11 when it is necessary to distinguish the discs of four kinds.

In the drawing, a block 1 comprising a spindle motor 12, a pickup 13, a synchronous detection part 14, a demodulation part 15, an error correction part 16, a first audio signal processing part 17 and a stream separation part 18 functions a reproducing unit, and when an SACD 11 is held in a reproduction position, disc control information recorded on the SACD 11 is read and is outputted to a genre display unit 19. Also, an audio signal obtained by reproducing the SACD 11 is outputted to a switch 8. Also, when image data is recorded in the data area 116 for extension of the SACD 11, the image data recorded in the data area 116 for extension is read out and is outputted to a video expansion part 5.

Also, when the disc 11 is a DVD, a video signal (compressed video signal) obtained by reproduction is outputted to the video expansion part 5 and an audio signal (compressed audio signal) obtained by reproduction is outputted to a second audio signal processing part 6. Also, when the disc 11 is a CD, an audio signal (linear PCM signal) obtained by reproduction is outputted to the second audio signal processing part 6. Also, when the disc 11 is a VCD, a video signal (compressed video signal) obtained by reproduction is outputted to the video expansion part 5 and an audio signal obtained by reproduction is outputted to the second audio signal processing part 6.

Specifically, the pickup 13 reads data recorded on the disc 11 rotated and driven by the spindle motor 12 and also, outputs a signal obtained by the reading to the synchronous detection part 14. The synchronous detection part 14 fetches digital data from the signal outputted from the pickup 13, and outputs the data to the demodulation part 15. The demodulation part 15 demodulates data before encoding by performing predetermined processing of the digital data outputted from the synchronous detection part 14. In the error correction part 16, error correction of the demodulated data is made and the data is outputted to the stream separation part 18.

The first audio signal processing part 17 converts an audio signal of a DSD (Direct Stream Digital) method sent from the stream separation part 18 into an analog audio signal, and outputs the signal to the switch 8.

When the reproduced disc 11 is the SACD and the pickup 13 reads a record area of an audio signal, the stream separation part 18 outputs data (audio signal of the DSD method) outputted from the error correction part 16 to the first audio signal processing part 17. Also, when image data is recorded in the data area 116 for extension of the SACD 11 and the pickup 13 reads the data area 116 for extension, data outputted from the error correction part 16 is outputted to the video expansion part 5. Also, when the pickup 13 reads disc control information about the SACD 11, data outputted from the error correction part 16 is outputted to a control unit 2.

Also, when the reproduced disc 11 is the DVD, a video stream among data streams outputted from the error correction part 16 is outputted to the video expansion part 5. Also, an audio stream is outputted to the second audio signal processing part 6 (illustration is omitted for a sub-picture stream). Also, when the pickup 13 reads disc control information about the DVD 11, data outputted from the error correction part 16 is outputted to the control unit 2.

Also, when the reproduced disc 11 is the CD, data outputted from the error correction part 16 is outputted to the second audio signal processing part 6. Also, when the pickup 13 reads disc control information about the CD 11, data outputted from the error correction part 16 is outputted to the control unit 2.

Also, when the reproduced disc 11 is the VCD, data indicating video among data outputted from the error correction part 16 is outputted to the video expansion part 5. Also, data indicating audio is outputted to the second audio signal processing part 6. Also, when the pickup 13 reads disc control information about the VCD 11, data outputted from the error correction part 16 is outputted to the control unit 2.

When the disc 11 is the DVD, the second audio signal processing part 6 makes D/A conversion after an audio stream outputted from the stream separation part 18 is decoded by an AC3 method. Then, an analog audio signal obtained by the D/A conversion is outputted to the switch 8. Also, when the disc 11 is the CD, a digital audio signal of a PCM method outputted from the stream separation part 18 is converted into an analog audio signal and is outputted to the switch 8. Also, when the disc 11 is the VCD, data outputted from the stream separation part 18 is converted into an analog audio signal and is outputted to the switch 8.

When the disc 11 is the SACD, the switch 8 outputs an analog audio signal outputted from the first audio signal processing part 17 to an amplifier 21 disposed in the outside according to instructions from the control unit 2. Also, when the disc 11 is the DVD, the CD or the VCD, an analog audio signal outputted from the second audio signal processing part 6 is outputted to the amplifier 21 (the amplifier 21 amplifies the analog audio signal outputted from the switch 8 and drives speakers 22).

When the disc 11 is the SACD, the video expansion part 5 expands data (image data recorded in the data area 116 for extension) outputted from the stream separation part 18 by a predetermined method (expansion method corresponding to a compression method of the image data recorded in the data area 116 for extension) and then outputs the data to an on-screen display part (hereinafter called an OSD part) 7. Also, when the disc 11 is the DVD, after a video stream outputted from the stream separation part 18 is expanded by an MPEG2 method, the video stream is outputted to the OSD part 7. Also, when the disc 11 is the VCD, data outputted from the stream separation part 18 is expanded and is outputted to the OSD part 7.

The OSD part 7 generates a signal indicating a character etc. instructed from the control unit 2, and superimposes the signal on a video signal outputted from the video expansion part 5. A D/A conversion part 9 converts a digital video signal outputted from the OSD part 7 into an analog video signal, and outputs the signal to a television image receiver 23 which is a display device disposed in the outside of an apparatus body 25.

An input part 4 comprises a key switch such as a power source key disposed in a front panel of the apparatus body 25 or a light receiving unit for receiving an infrared signal sent from a remote controller 3, etc. and when instructions from a user are inputted, the inputted instructions are sent to the control unit 2.

The control unit 2 is constructed using a microcomputer as a main part, and controls a main action serving as the disc reproducing apparatus. That is, when the disc 11 is the SACD, an action of the reproducing unit 1 is controlled and also an audio signal from the first audio signal processing part 17 is outputted from the switch 8 and thereby an audio signal obtained by reproducing the SACD 11 is outputted to the amplifier 21. Also, when the disc 11 is the CD, actions of the reproducing unit 1 (excluding the first audio signal processing part 17) and the second audio signal processing part 6 are controlled and also an audio signal from the second audio signal processing part 6 is outputted from the switch 8 and thereby an audio signal obtained by reproducing the CD 11 is outputted to the amplifier 21.

Also, when the disc 11 is the DVD or the VCD, actions of the reproducing unit 1 (excluding the first audio signal processing part 17), the second audio signal processing part 6 and the video expansion part 5 are controlled and also an audio signal from the second audio signal processing part 6 is outputted from the switch 8 and thereby a video signal obtained by reproducing the DVD 11 or the VCD 11 is outputted to the television image receiver 23 and an audio signal obtained by reproducing the DVD 11 or the VCD 11 is outputted to the amplifier 21.

The genre display unit 19 is constructed by a part of a function of the microcomputer constructing the control unit 2. Then, from the fact that the SACD 11 is held in a reproduction position, disc control information recorded on the SACD 11 is read and when the read disc control information is outputted from the reproducing unit 1, a genre of tunes recorded on the SACD 11 is automatically displayed on the television image receiver 23 based on genre information included in the disc control information.

Also, when the genre is displayed on the television image receiver 23, as shown in FIG. 3, a genre of each tune (displayed and distinguished by a track number) recorded on the SACD 11 is associated with a track number and is displayed (shown by 221). Also, by highlighting one of the track numbers displayed (shown by 222), the selected track number is indicated (when instructions of reproduction are inputted to the remote controller 3 at this time, the control unit 2 makes the reproducing unit 1 start reproduction from a tune of the track number highlighted) Also, when image data recorded in the data area 116 for extension of the SACD 11 is outputted from the stream separation part 18 to the video expansion part 5, the genre display unit 19 displays an image outputted from the video expansion part 5 on the television image receiver 23 as an image for background in display of the genre.

Figure 4:
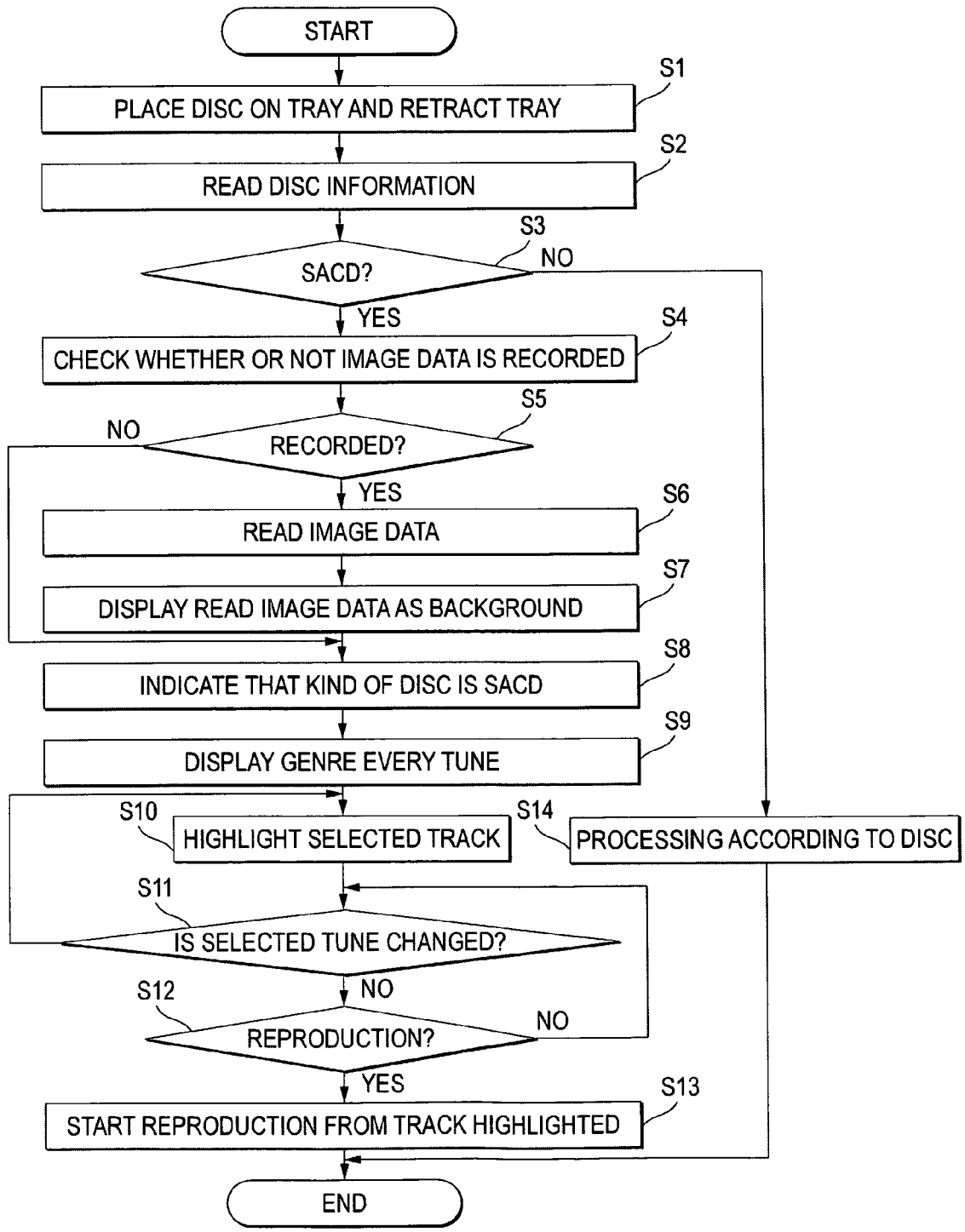
FIG. 4 is a flowchart showing a main action of the embodiment at the time when a genre of tunes recorded on an SACD is displayed on a display device.

FIG. 4 is a flowchart showing a main action of an embodiment at the time when a genre of tunes recorded on an SACD is displayed on a display device. The action of the embodiment will be described with reference to the same drawing as necessary.

When the disc 11 is held in a reproduction position by retracting a tray after the disc 11 is placed on the tray (illustration is omitted) moved in a takeout position (step S1), the control unit 2 instructs the reproducing unit 1 to read disc control information recorded on the disc 11 held in the reproduction position. According to instructions from the control unit 2, the reproducing unit 1 reads the disc control information from the disc 11 and outputs the read disc information to the control unit 2 (step S2).

Since information indicating a kind of the disc 11 is included in the disc control information, the control unit 2 determines whether the disc 11 held in the reproduction position is an SACD or other discs from the disc control information outputted by the reproducing unit 1. Then, when it is proved that the disc 11 held in the reproduction position is the SACD, it is checked whether or not image data is recorded in the data area 116 for extension (steps S3, S4). When the image data is recorded, using the reproducing unit 1, the image data is read out and an image (for example, a static image) by the image data read out is displayed on the television image receiver 23 as an image for background in genre display (steps S5, S6).

Together with display of the image for background described above, a character of "SACD" (shown by 223) is displayed on the upper left of a screen of the television image receiver 23 in order to indicate that the disc 11 held in the reproduction position is the SACD (step S8). Also, a genre (shown by 221) every tune (shown as a track number) is associated with a track number and is displayed (step S9). In this case, a length for each of the tunes is also displayed (shown by 224). Also, the selected track number (a tune of the first track is first selected) is highlighted (shown by 222) (step S10).

Thereafter, it proceeds to a loop action for checking whether or not an operation for changing the selected tune (track number) is inputted (step S11) and whether or not instructions of reproduction are inputted (step S12). When the operation (operation of upward and downward keys) for changing the selected tune is inputted in this loop action, the highlighted tune (track number) is changed according to the inputted operation (steps S11, S10). Also, when the instructions of reproduction are inputted, using the reproducing means 1, reproduction is started from the tune of the track number highlighted. And, time information (shown by 225) indicating a reproduction position is displayed (steps S12, S13).

Incidentally, when it is proved that the image data is not recorded in the action of step S4 described above, the action proceeds from step S5 to step S8 and a character of "SACD" shown by 223 is displayed without displaying the image for background (for example, blue back display). Also, a genre of every tune is displayed (step S9).

Also, when it is proved that the disc 11 is not the SACD in the determination of step S3 described above, the action proceeds from step S3 to step S14 and processing according to a kind of the disc 11 at this time is performed. That is, when the disc 11 is a DVD, an action etc. for display of a menu screen are started. Also, when the disc 11 is a CD, a character of "CD" or the number of tracks, etc. are displayed. Also, when the disc 11 is a VCD, an action according to the VCD is performed.

Incidentally, the invention is not limited to the embodiment described above and the case that the television image receiver 23 disposed in the outside is used as the display device has been described, but it can be configured so that a display device capable of displaying plural lines of characters is disposed in an apparatus body and genres are displayed on this display device.

Also, the case that the image data recorded in the data area 116 for extension is a static image has been described, but it can similarly be applied to the case of a moving image. That is, it can also be constructed so that a moving image recorded in the data area 116 for extension is displayed as background of display of a character indicating a genre.

Also, it can be configured so that reproducible discs are limited to only an SACD and a CD (in this case, processing circuit of a video signal becomes unnecessary, so that the configuration is simplified).

In the case of making supplementary description below, when tunes are recorded on a disc by an MP3 method, information indicating each of the genres of the tunes recorded can be recorded together. However, in this case, the information indicating the genre is recorded in the head portion of data of the tune. As a result of this, in the case of attempting to display a list of the genres of the tunes recorded on the disc, it is necessary to read the head portion of data of each of the tunes, so that it takes time to display the list of the genres. However, in the SACD 11, information indicating the genres of all the tunes (tracks) can be obtained from disc control information recorded in the inner circumference side of the disc. As a result of this, in the case of displaying a list of genres of tunes using the SACD 11 as a target, a peculiar effect capable of displaying the list of the genres about all the recorded tunes for the approximately same period as a period necessary to distinguish the disc after the disc is held in a reproduction position can be obtained.

What is claimed is:

1. A disc reproducing apparatus comprising:

a reproducing unit for reading disc control information from an SACD when the SACD is held in a reproduction position and for reproducing and outputting an audio signal, the reproducing unit reading out and outputting image data recorded in a data area for extension when the image data is recorded in the data area for extension which is a data area disposed in the most outer circumference side of the SACD; and a control unit associating a genre of each tune recorded on the SACD with a track number corresponding to each of the tunes based on the disc control information read by the reproducing unit and automatically displaying the genre on a display device, the control unit displaying the track number selected by a user while highlighting it, the control unit displaying the image data outputted from the reproducing unit on the display device as an image for background in display of the genre, and the control unit causing the reproducing unit to start reproduction from a tune of the track number highlighted when an instruction of reproduction is inputted.

* * * * *